United States Patent [19]
Onodera et al.

[11] Patent Number: 6,071,999
[45] Date of Patent: Jun. 6, 2000

[54] PROCESS FOR PREPARING STYRENIC RESIN

[75] Inventors: Tsutomu Onodera; Kazuyoshi Fukada; Takashi Saeki, all of Ichihara, Japan

[73] Assignee: Idemitsu Petrochemical Co., Ltd., Tokyo, Japan

[*] Notice: This patent is subject to a terminal disclaimer.

[21] Appl. No.: 09/033,237

[22] Filed: Mar. 3, 1998

Related U.S. Application Data

[63] Continuation of application No. 08/765,463, filed as application No. PCT/JP96/01328, May 20, 1996, Pat. No. 5,760,172.

[30] Foreign Application Priority Data

| May 26, 1995 | [JP] | Japan | 07-127727 |
| May 26, 1995 | [JP] | Japan | 07-127728 |
| May 26, 1995 | [JP] | Japan | 07-127729 |

[51] Int. Cl.$^7$ .............. C08J 07/02; C08J 07/14
[52] U.S. Cl. .......... 524/577; 524/115; 524/323; 524/414; 524/401; 524/81; 528/487; 528/495; 528/491; 528/499; 264/211; 264/331.15
[58] Field of Search ............ 528/487, 495, 528/496, 491, 499, 500, 501; 524/577, 81, 115, 323, 414, 401; 264/211, 331.15

[56] References Cited

U.S. PATENT DOCUMENTS

| 5,166,238 | 11/1992 | Nakano et al. | 524/120 |
| 5,292,587 | 3/1994 | Funaki et al. | 428/402 |
| 5,756,658 | 5/1998 | Onodera et al. | 528/501 |
| 5,760,172 | 6/1998 | Onodera et al. | 528/496 |

FOREIGN PATENT DOCUMENTS 3056504  3/1991  Japan .

*Primary Examiner*—David W. Wu
*Assistant Examiner*—Roberto Rabago
*Attorney, Agent, or Firm*—Oblon, Spivak, McClelland, Maier & Neustadt, P.C.

[57] ABSTRACT

A process for preparing a styrenic resin is herein disclosed which comprises the step of volatilizing extrudinga styrenic polymer (SPS) powder having a syndiotactic configuration in the presence of water, an alcohol or an antioxidant by the use of an extruder to obtain pellets. According to this process, the operation of volatilization extrusion is done in the presence of water, the alcohol or the antioxidant to stably and efficiently prepare the SPS pellets in which yellowing is inhibited, and the operation of the volatilization extrusion is carried out in the presence of water to stably and efficiently prepare the SPS pellets containing a less amount of a remaining volatile component such as an unreacted monomer.

3 Claims, No Drawings

PROCESS FOR PREPARING STYRENIC RESIN

This application is a Continuation of application Ser. No. 08/765,463, filed on Jan. 27, 1997, now U.S. Pat. No. 5,760,172 which was filed as an International Application PCT/JP96/01328 on May 20, 1996.

FIELD OF THE INVENTION

The present invention relates to a process for preparing a styrenic resin, and more specifically, it relates to a method for effectively inhibiting the yellowing of pellets of a styrenic polymer powder having a syndiotactic configuration in the case that the styrenic polymer powder is volatilized and extruded by the use of an extruder to prepare the pellets, or a method for economically and efficiently decreasing a remaining volatile component such as an unreacted monomer in the pellets.

BACKGROUND ART

A styrenic polymer (hereinafter abbreviated to "SPS" sometimes) having a syndiotactic configuration obtained by improving a styrenic polymer having an atactic configuration is excellent in heat resistance and chemical resistance.

The group of the present inventors has already succeeded in the development of a styrenic polymer having a high syndiotacticity, and this group has further disclosed that the SPS can be obtained by the use of a catalyst comprising a titanium compound, a catalytic product (an alkylaluminoxane) of an organic aluminum compound and a condensing agent, or a coordinated complex compound comprising a cation and an anion in which a plurality of groups are bonded to a metal (Japanese Patent Application Laid-open Nos. 187708/1987 and 249503/1992).

The above-mentioned styrenic polymer is prepared by a non-solvent polymerization method or a slurry polymerization method, but in the case that the above-mentioned styrenic polymer is prepared by such a method, it is advantageous from the viewpoints of a catalytic activity and productivity that styrene is highly concentrated and then polymerized. However, this preparation is carried out by the use of a catalyst containing a metal such as Al, Ti or Fe, and therefore a large amount of a metallic component remains in the obtained polymer, depending upon the kind of selected catalyst. This remaining metallic component causes the deterioration of the molecular weight and color tone of the polymer. Accordingly, it has been desired to decrease the remaining catalytic component in the obtained polymer product by a deashing treatment (the removal of the remaining catalyst).

As this deashing treatment method, there are a method which comprises adding a deashing agent, a method which comprises swelling the polymer with a swelling agent, and a method which comprises raising a treatment temperature in each of these methods to improve a deashing efficiency.

However, these methods have some problems. For example, the deashing efficiency is poor, washing is required, and a stable operation is difficult to do.

That is to say, in the method which comprises adding the deashing agent for the treatment, a step for removing the deashing agent is essential, and for the sake of the removal, a large amount of a solvent must be used, which makes the preparation process intricate and increases the cost of facilities. In the method which comprises adding the swelling agent for the treatment, deactivation and deashing can be accomplished under relatively mild conditions, but the polymer might dissolve or cohere, depending upon the composition and conversion of the polymer, the composition of a treatment solution and a treatment temperature. Owing to this fact, a stable operation cannot be accomplished. In addition, since the polymer swells, a waste liquid containing a remaining catalyst solution gets into the polymer, and thus the amount of the metal cannot be decreased to a certain level or less.

Therefore, it has been desired to develop a method for stably and easily preparing the SPS which can effectively inhibit yellowing and which has good characteristics.

On the other hand, in the case that the above-mentioned styrenic polymer can be prepared by a non-solvent polymerization method or a slurry polymerization method, about 0.1 to 50% by weight of a remaining volatile component such as an unreacted monomer is contained in the obtained polymer. Therefore, a drying volatilization treatment has been carried out as a post-treatment subsequent to the polymerization by a drying machine to remove a remaining volatile component such as the monomer therefrom.

However, in the case that the removal of the remaining volatile component is made by the use of the drying machine, a residence time is prolonged, which is not economical. In addition, a large amount of the unreacted monomer and the like easily remains in the product, and in this case, molding failure occurs, and the transparency of films or the like deteriorates, so that such molded articles are not desirable any more as wrapping materials for foods.

Therefore, it has been desired to develop a method for economically and efficiently removing a remaining volatile component such as an unreacted monomer from the SPS prepared by the non-solvent polymerization method or the slurry polymerization method.

DISCLOSURE OF THE INVENTION

The present invention has been developed under such circumstances. That is to say, an object of the present invention is to provide a process for stably and efficiently preparing, by a simple means, SPS pellets in which yellowing can effectively be inhibited and which can supply a molded article having a high quality.

Another object of the present invention is to provide a process for stably and efficiently preparing SPS pellets in which a remaining volatile component such as a monomer in an SPS powder can economically and efficiently be decreased at the time of extrusion, whereby a molded article having a good quality and containing a less amount of the remaining volatile component can be prepared to prevent the emission of a bad smell at the time of the molding.

The present inventors have intensively researched with the intention of achieving the above-mentioned object. As a result, it has been found that if a styrenic polymer powder having a syndiotactic configuration is volatilized and extruded in the presence of water, an alcohol or an antioxidant by the use of an extruder to prepare pellets, the SPS pellets in which yellowing is effectively inhibited can stably and efficiently be obtained, and it has also been found that that if a styrenic polymer powder is volatilized and extruded in the presence of water, the SPS pellets in which a remaining volatile component such as an unreacted monomer is effectively decreased can stably and efficiently be obtained. The present invention has been completed on the basis of the found knowledge.

That is to say, the present invention is directed to (1) a process for preparing a styrenic resin which comprises the step of extruding a styrenic polymer powder having a syndiotactic configuration in the presence of water by the use of an extruder (the first aspect of the present invention), (2) a process for preparing a styrenic resin which comprises the step of extruding a styrenic polymer powder having a syndiotactic configuration in the presence of an alcohol by the use of an extruder (the second aspect of the present invention), and (3) a process for preparing a styrenic resin which comprises the step of extruding a styrenic polymer powder having a syndiotactic configuration in the presence of an antioxidant by the use of an extruder (the third aspect of the present invention).

BEST MODE FOR CARRYING OUT THE INVENTION

The present invention (the first, second and third aspects) is concerned with a process for preparing SPS pellets in which yellowing is inhibited, and the first aspect of the present invention is concerned with a process for preparing SPS pellets in which a remaining volatile component such as an unreacted monomer is decreased.

A styrenic polymer which is applicable in the preparation processes regarding the present invention has a syndiotactic configuration. Here, the syndiotactic configuration of the styrenic polymer means that its stereochemical structure has a syndiotactic structure, i.e., a steric structure in which phenyl groups and substituted phenyl groups which are side chains are located alternately in opposite directions on a main chain comprising carbon—carbon bonds. Its tacticity can be quantitatively determined by a nuclear magnetic resonance method using an isotopic carbon (a $^{13}$C-NMR method). The tacticity which can be determined by the $^{13}$C-NMR method can be called as follows in accordance with the number of existing plural continuous constitutional units. For example, in the case that the continuous units are two, the tacticity is called a diad; in the case that the continuous units are three, it is called a triad; and in the case that the continuous units are five, it is called a pentad. "The styrenic polymer having the syndiotactic configuration" referred to in the present invention means the styrenic polymer in which the content of the syndiotacticity is usually 75% or more, preferably 85% or more in terms of a racemic diad, or it is usually 30% or more, preferably 50% or more in terms of a racemic pentad. Examples of "the styrenic polymer" include polymers obtained by polymerizing aromatic vinyl compounds as monomers, for example, styrene; alkylstyrenes such as p-methylstyrene, o-methylstyrene, m-methylstyrene, 2,4-dimethylstyrene, 2,5-dimethylstyrene, 3,4-dimethylstyrene, 3,5-dimethylstyrene and p-t-butylstyrene; halogenated styrenes such as p-chlorostyrene, o-chlorostyrene, m-chlorostyrene, p-bromostyrene, o-bromostyrene, m-bromostyrene, p-fluorostyrene, o-fluorostyrene, m-fluorostyrene and o-methyl-p-fluorostyrene; alkenylstyrenes such as divinylbenzene, p-isopropenylstyrene, 4-vinylbiphenyl, 3-vinylbiphenyl and 2-vinylbiphenyl; alkoxystyrenes such as methoxystyrene and ethoxystyrene; and aminostyrenes such as dimethylaminostyrene and diphenylaminostyrene, copolymers obtained by copolymerizing two or more kinds of these aromatic vinyl compounds as comonomers, mixtures of these polymers and copolymers, and these substances to which various kinds of additives such as pigments are added.

Furthermore, no particular restriction is put on the molecular weight of this styrenic polymer, but its weight-average molecular weight is preferably 10000 to 3000000, more preferably 50000 to 1500000. In addition, the width of a molecular weight distribution is not limited, either, and the styrenic polymers having various molecular weight distributions are applicable. This melting point of the styrenic polymer having the syndiotactic configuration is in the range of 160 to 310° C., and hence, the heat resistance of this kind of styrenic polymer is much more excellent, as compared with a conventional styrenic polymer having an atactic configuration.

No particular restriction is put on a preparation method of the styrenic polymer having the syndiotactic configuration, but this styrenic polymer can be prepared, for example, by polymerizing one or copolymerizing of two or more of styrenic monomers (which correspond to the above-mentioned styrenic polymers) in the presence of a known catalyst comprising (a) a transition metal compound, (b) a coordinated complex compound comprising a cation and an anion in which a plurality of groups are bonded to a metal, or an aluminoxane, and if necessary, (c) an alkyl group-containing metallic compound.

In the present invention, the styrenic polymer having the syndiotactic configuration is extruded by an extruder while volatilized, thereby forming pellets. The operation of volatilization.extrusion is required to be carried out by the extruder in the presence of water in the first aspect, in the presence of an alcohol in the second aspect, and in the presence of an antioxidant in the third aspect.

In the first aspect of the present invention, the operation of the volatilization.extrusion is carried out in the presence of water, whereby SPS pellets in which yellowing is inhibited can be obtained, with the result that a value of YI can usually be decreased to 30 or less, preferably 15 or less. In this case, the amount of water is usually in the range of 0.01 to 5% by weight, preferably 0.1 to 3% by weight, more preferably 0.5 to 1.5% by weight based on the weight of the styrenic polymer powder having the syndiotactic configuration. Water may directly be fed to the extruder, or may be added to the styrenic polymer powder. Alternatively, water may be fed to the molten and thus plasticized styrenic polymer powder. Furthermore, when the extrusion is carried out by the use of the extruder having a plurality of vents, the feed of water may be done after the volatilization has been made through the optional vent on the upstream side of the final vent. In the case that the extrusion is done by the use of a plurality of the extruders, the feed of water may be done after the volatilization has been made through the optional vent on the upstream side of the final vent of the extruder which is positioned on the most downstream side. In addition, water to be fed may be in the state of liquid or water vapor.

The feed of water is also effective for the decrease in a volatile component such as the unreacted monomer which is usually contained in an amount of about 0.1 to 50% by weight in the styrenic polymer, and hence, the feed of water can supply an effect that the content of the volatile component can be decreased to less than 1000 ppm.

On the other hand, in the second aspect of the present invention, the operation of the volatilization extrusion can be carried out in the presence of the alcohol to obtain the SPS pellets which are scarcely yellowed. In general, the value of YI can be controlled to 30 or less, preferably 15 or less. In this case, the amount of the alcohol is usually 0.01% by weight or more, preferably in the range of 0.1 to 5% by weight, more preferably 0.7 to 3% by weight based on the weight of the styrenic polymer powder having the syndiotactic configuration. The alcohol may directly be fed to the extruder, or may be added to the styrenic polymer powder. Alternatively, the alcohol may be fed to the molten and thus plasticized styrenic polymer powder. Furthermore, when the extrusion is carried out by the use of the extruder having a plurality of vents, the feed of the alcohol may be done after the volatilization has been made through the optional vent on the upstream side of the final vent. In the case that the extrusion is done by the use of a plurality of the extruders connected in series, the feed of the alcohol may be done after the volatilization has been made through the optional vent on the upstream side of the final vent of the extruder which is positioned on the most downstream side.

Examples of the alcohol which can be used in the present invention include aliphatic alcohols having 1 to 4 carbon atoms such as methanol, ethanol, propanol and butanol, and above all, methanol and ethanol are preferable. These alcohols may be used singly or in a combination of two or more thereof.

In the third aspect of the present invention, the operation of the volatilization.extrusion can be carried out in the presence of the antioxidant to obtain the SPS pellets which are scarcely yellowed. In general, the value of YI can be controlled to 30 or less, preferably 20 or less. In this case, the amount of the antioxidant is usually in the range of 0.001 to 5% by weight, preferably 0.01 to 2% by weight, more preferably 0.1 to 0.4% by weight based on the weight of the styrenic polymer powder having the syndiotactic configuration. This antioxidant may directly be fed to the extruder, or may be added to the styrenic polymer powder. Alternatively, the antioxidant may be fed to the molten and thus plasticized styrenic polymer powder. Furthermore, when the extrusion is carried out by the use of the extruder having a plurality of vents, the feed of the antioxidant may be done after the volatilization has been made through the optional vent on the upstream side of the final vent. In the case that the extrusion is done by the use of a plurality of the extruders connected in series, the feed of the antioxidant may be done after the volatilization has been made through the optional vent on the upstream side of the final vent of the extruder positioned on the most downstream side. The antioxidant which is in the state of a powder may be added without any treatment, or it may be dissolved in an aromatic hydrocarbon solvent and then added.

The antioxidant which can be used in the present invention can be selected from the group consisting of phenolic antioxidants and phosphoric antioxidants. The employment of the plural antioxidants is also acceptable.

No particular restriction is put on the phenolic antioxidants, and typical examples of these phenolic antioxidants include 2,6-di-t-butyl-4-methylphenol, 2,6-di-t-butyl-4-ethylphenol, n-octadecyl-3-(3,5-di-t-butyl-4-hydroxyphenyl) propionate, pentaerythrityl-tetrakis[3-(3,5-di-t-butyl-4-hydroxyphenyl) propionate], 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, triethylene glycol-bis[3-(3-t-butyl-5-methyl-4-hydroxyphenyl) propionate], 1,6-hexanediol-bis [3-(3,5-di-t-butyl-4-hydroxyphenyl) propionate], 3,9-bis[1, 1-di-methyl-2-[β-(3-t-butyl-4-hydroxy-5-methylphenyl) propionyloxy]ethyl]-2,4,8,10-tetraoxaspiro[5,5]undecane, 1,3,5-trimethyl-2,4,6-tris(3,5-di-t-butyl-4-hydroxybenzyl) benzene, tris(3,5-di-t-butyl-4-hydroxybenzyl) isocyanurate, tris(4-t-butyl-2,6-di-methyl-3-hydroxybenzyl) isocyanurate and 2,4-bis-(n-octylthio)-6-(4-hydroxy-3,5-di-t-butylanilino)-1,3,5-triazine. Above all, pentaerythrityl-tetrakis[3-(3,5-di-t-butyl-4-hydroxyphenyl) propionate] and 2,4-bis-(n-octylthio)-6-(4-hydroxy-3,5-di-t-butylanilino)-1,3,5-triazine are preferable.

No particular restriction is put on the phosphoric antioxidants, and typical examples of these phosphoric antioxidants include tetrakis(2,4-di-t-butylphenyl)-4,4-biphenylene phosphonite, tris(2,4-di-t-butylphenyl) phosphite, 2,2'-methylenebis(4,6-di-t-butylphenyl)octyl phosphite, bis(2,4-di-t-butylphenyl)pentaerythritol diphosphite, bis(2,6-di-t-butyl-4-methylphenyl) pentaerythritol diphosphite, di(nonylphenyl)pentaerythritol diphosphite, phenyl-bisphenol A-pentaerythritol diphosphite, distearylpentaerythritol diphosphite, dioctyl-pentaerythritol diphosphite, dilaurylpentaerythritol diphosphite, diphenylpentaerythritol diphosphite, dicyclo-hexylpentaerythritol diphosphite, bis(2,4,6-tri-t-butylphenyl)pentaerythritol diphosphite, 2,2'-ethylidenebis (4,6-di-t-butylphenyl) fluorophosphite, trisindecyl phosphite, trisdodecyl phosphite, phenylisooctyl phosphite, phenylindecyl phosphite, phenyldodecyl phosphite, diphenylisooctyl phosphite, diphenylisodecyl phosphite, diphenyldodecyl phosphite, triphenyl phosphite, tris (mononoylphenyl) phosphite and tris(dinonylphenyl) phosphite. Above all, bis(2,6-di-t-butyl-4-methylphenyl) pentaerythritol diphosphite is preferable.

In the first, second and third aspects of the present invention, as the extruder which can be used for this volatilization.extrusion, a vent type extruder having one vent or plural vents can be used, but this type extruder may optionally serially be combined with one or more of a single screw extruder, an intermeshing type one-directional rotation twin-screw extruder, an intermeshing type extruder, a non-intermeshing type opposite-directional rotation twin-screw extruder and the like. If necessary, a gear pump may be installed on the downstream side of the extruder. The internal pressure of each vent is in the range of 0 to atmospheric pressure, preferably 0 to 200 Torr, more preferably 0 to 50 Torr. If the internal pressure of the vent is too high, it is difficult to accomplish sufficient volatilization. The extrusion is preferably carried out at a molding temperature in the range of from the melting point of the polymer to 400° C. at an extrusion rate meeting the equation $Q/(D \times H \times V)= 1.5 \times 10^4$ to $6.0 \times 10^5$ (wherein Q is an extrusion rate (kg/hr); D is a screw diameter (m); H is a screw groove depth (m); and V is a screw peripheral speed (m/sec)). In the case that a plurality of the serially connected extruders are used, the above-mentioned extrusion rate means an extrusion rate at the outlet of the most downstream extruder. The screw peripheral speed of the extruder depends upon the diameter of the screw, the amount of the polymer to be treated and the like, but it is preferably in the range of 0.1 to 3.5 m/sec in order to efficiently promote surface renewal at the vent. If the peripheral speed is in excess of 3.5 m/sec, heat is abnormally generated, and a required power cost also increases inconveniently.

In the present invention, a resin temperature at the time of the extrusion is advantageously in the range of from the melting point of the applicable styrenic polymer to 400° C. If the resin temperature is more than 400° C., the styrenic polymer tends to decompose. Accordingly, the resin temperature is preferably in the range of from the melting point of the polymer to 370° C. In this case, the cylinder temperature of the extruder is preferably set in the range of from room temperature to 400° C., more preferably from a glass transition temperature to 370° C., most preferably from the glass transition temperature to 320° C.

In the present invention (first, second and third aspects), in order to sufficiently inhibit the yellowing, and in the first aspect of the present invention, in order to heighten the efficiency of the volatilization, an inert gas such as nitrogen, argon, helium or carbon dioxide or an inert liquid can be poured into the extruder.

Furthermore, in the present invention, the first, second and third aspects can suitably be combined for the practice of the volatilization.extrusion.

Next, the present invention will be described in more detail with reference to examples, but the scope of the present invention should not be limited to these examples at all.

EXAMPLE 1

To a styrenic polymer powder of a syndiotactic configuration having a viscosity-average molecular weight of 330000 and an average particle diameter of 160 $\mu$m and containing 1.8% by weight of styrene as a remaining monomer on the basis of its wet state, water was added in an amount of 1.0% by weight based on the weight of the polymer powder, and the water-containing powder was then volatilized and extruded under conditions of a cylinder temperature of 290° C., a molding temperature of 300 to 320° C., a first vent internal pressure of 200 Torr, a second vent internal pressure of 20 Torr, a screw peripheral speed of 0.5 m/sec (co-rotation) and an extrusion rate of 55 kg/hr, i.e., Q/(D×H×V)=2.6×10$^5$ by the use of a twin-screw extruder made by The Japan Steel Works, Ltd. [TEX44-XCT (L/D=38.5, D=47 mm, H=9.0 mm and vent number=2)].

The resulting polymer was collected in the form of pellets, and as a result of measurement in accordance with JIS-K-7150, the YI value of the polymer was 14. In addition, an amount of the remaining monomer in the polymer was measured by a gas chromatography. As a result, it was apparent that 800 ppm of the styrene monomer was contained in the polymer.

EXAMPLE 2

The operation of volatilization.extrusion was carried out by the same procedure as in Example 1 except that water was fed through a vent on the downstream side of the first vent of an extruder instead of the addition of water to a styrenic polymer powder. The resulting polymer was collected in the form of pellets, and the YI value of the polymer was 14. In addition, the amount of the remaining monomer in the obtained pellets was 750 ppm.

COMPARATIVE EXAMPLE 1

The operation of volatilization.extrusion was carried out by the same procedure as in Example 1 except that water was not added. The resulting polymer was collected in the form of pellets, and the YI value of the polymer was 40. In addition, the amount of a remaining monomer in the obtained pellets was 1000 ppm.

EXAMPLE 3

To a styrenic polymer powder of a syndiotactic configuration having a viscosity-average molecular weight of 300000 and an average particle diameter of 300 $\mu$m and containing 30% by weight of styrene as a remaining monomer on the basis of its wet state, methanol was added in an amount of 2.0% by weight based on the weight of the polymer powder, and the water-containing powder was then volatilized and extruded under conditions of a cylinder temperature of 290° C., a molding temperature of 300 to 320° C., a first vent internal pressure of 200 Torr, a second vent internal pressure of 20 Torr, a screw peripheral speed of 0.5 m/sec (co-rotation) and an extrusion rate of 28 kg/hr, i.e., Q/(D×H×V)=1.32×10$^5$ by the use of a twin-screw extruder made by The Japan Steel Works, Ltd. [TEX44-XCT (L/D=38.5, D=47 mm, H=9.0 mm and vent number=2)].

The resulting polymer was collected in the form of pellets, and the YI value of the polymer was 13.

EXAMPLE 4

The operation of volatilization.extrusion was carried out by the same procedure as in Example 3 except that methanol was fed after the plasticization and melting of a styrenic polymer powder in an extruder, instead of the addition of methanol to the styrenic polymer powder. The YI value of obtained pellets was 12.

EXAMPLE 5

The operation of volatilization.extrusion was carried out by the same procedure as in Example 3 except that methanol was replaced with ethanol. The YI value of obtained pellets was 14.

COMPARATIVE EXAMPLE 2

The operation of volatilization.extrusion was carried out by the same procedure as in Example 3 except that methanol was not added. The YI value of obtained pellets was 43.

EXAMPLE 6

To a styrenic polymer powder of a syndiotactic configuration having a viscosity-average molecular weight of 250000 and an average particle diameter of 200 $\mu$m and containing 29% by weight of styrene as a remaining monomer on the basis of its wet state, Irganox 1010 made by Ciba-Geigy was added in an amount of 0.2% by weight based on the weight of the polymer powder, and they were then mixed. Next, the resulting mixture was volatilized and extruded under conditions of a cylinder temperature of 290° C., a molding temperature of 300 to 320° C., a first vent internal pressure of 200 Torr, a second vent internal pressure of 20 Torr, a screw peripheral speed of 0.5 m/sec (co-rotation) and an extrusion rate of 28 kg/hr, i.e., Q/(D×H×V)=1.32×10$^5$ by the use of a twin-screw extruder made by The Japan Steel Works, Ltd. [TEX44-XCT (L/D=38.5, D=47 mm, H=9.0 mm and vent number=2)].

The resulting polymer was collected in the form of pellets, and its YI value was 18.

Incidentally, Irganox 1010 was pentaerythrityltetrakis[3-(3,5-di-t-butyl-4-hydroxyphenyl)propionate].

EXAMPLE 7

The operation of volatilization.extrusion was carried out by the same procedure as in Example 6 except that, instead of the addition of Irganox 1010 made by Ciba-Geigy to a styrenic polymer powder, a 10% by weight ethylbenzene solution of Irganox 1010 was fed in an amount of 2.0% by weight based on the weight of the powder after the plasticization and melting of a styrenic polymer powder in an extruder. The YI value of obtained pellets was 17.

EXAMPLE 8

The operation of volatilization.extrusion was carried out by the same procedure as in Example 6 except that Irganox 1010 made by Ciba-Geigy was replaced with PEP36 made by Adeca-Argas Co., Ltd. The YI value of obtained pellets was 20.

Incidentally, PEP36 was bis(2,6-di-t-butyl-4-methylphenyl)pentaerythritol diphosphite.

COMPARATIVE EXAMPLE 3

The operation of volatilization.extrusion was carried out by the same procedure as in Example 6 except that Irganox 1010 made by Ciba-Geigy was not added. The YI value of obtained pellets was 41.

Possibility of Industrial Utilization

According to the present invention, a styrenic polymer powder having a syndiotactic configuration can be volatilized and extruded by an extruder to stably and efficiently prepare pellets in which yellowing is inhibited, or pellets containing a less amount of a remaining volatile component such as an unreacted monomer.

Therefore, a styrenic resin prepared by the present invention can suitably be utilized as a material for various industrial products, and hence, its industrial significance is extremely large.

What is claimed is:

1. A process for preparing a styrenic resin which comprises the step of extruding, by volatilization extrusion, a styrenic polymer powder having syndiotactic configuration, in the presence of water, by the use of an extruder;

wherein the styrenic polymer powder, to which water is added, is fed to the extruder, followed by the extrusion.

2. A process for preparing a styrenic resin which comprises the step of extruding, by volatilization extrusion, a styrenic polymer powder having syndiotactic configuration, in the presence of water, by the use of an extruder;

wherein the styrenic polymer powder, to which water is added, is fed to the extruder, followed by the extrusion, wherein said water is present in an amount of 0.01 to 5% by weight based on the weight of the styrenic polymer powder.

3. A process for preparing a styrenic resin which comprises the step of extruding by volatilization extrusion a styrenic polymer powder having a syndiotactic configuration in the presence of an antioxidant by the use of an extruder.

* * * * *